United States Patent [19]

Harza

[11] 4,044,569
[45] Aug. 30, 1977

[54] REFUSE DISPOSAL APPARATUS

[76] Inventor: Richard D. Harza, 150 S. Wacker, Chicago, Ill. 60606

[21] Appl. No.: 677,221

[22] Filed: Apr. 15, 1976

[51] Int. Cl.² .......................... F25C 5/14; B02C 11/08; B30B 1/00; B30B 15/06
[52] U.S. Cl. .................................... 62/341; 100/192; 100/229 A; 100/93 P
[58] Field of Search ........................... 62/62, 64, 341; 100/93 P, 192, 229 A

[56] References Cited

U.S. PATENT DOCUMENTS

| | | | |
|---|---|---|---|
| 3,514,969 | 6/1970 | Harza | 62/341 |
| 3,650,120 | 3/1972 | Harza | 62/341 |
| 3,659,427 | 5/1972 | Harza | 100/229 A |
| 3,685,309 | 8/1972 | Harza | 62/341 |
| 3,752,066 | 8/1973 | Charles | 100/192 |

Primary Examiner—Lloyd L. King
Attorney, Agent, or Firm—Olson, Trexler, Wolters, Bushnell & Fosse, Ltd.

[57] ABSTRACT

Apparatus is provided for compressing refuse, for freezing the compressed refuse, and for storing the frozen, compressed refuse for subsequent pickup by a refuse collector. A clam-shell like device with hold bars thereon is utilized for a backup structure for previously frozen refuse, which previously frozen serves as a backup for the compression of fresh refuse. The frozen refuse is maintained at optimum temperature.

10 Claims, 4 Drawing Figures

REFUSE DISPOSAL APPARATUS

BACKGROUND AND OBJECTS OF THE INVENTION

Household and other refuse is commonly disposed of be being placed in so called garbage cans. Such refuse typically includes almost any combination of plastic, paper, ceramic, glass, metal, food wastes (both liquid and solid), and perhaps other materials. Such refuse is generally wet enough to freeze when suitably chilled. However, water can be added if necessary for proper freezing. Approximately twice a week it is necessary to pick up the refuse before it accumulates to too great a volume, and before it deteriorates too badly. Such frequent collection is expensive. In various of my own prior patents I have disclosed means and methods for compacting refuse by compression and for freezing the compacted refuse. Since the refuse is compacted a great deal more total refuse can be stored in a home environment before it is necessary for the refuse to be collected. Furthermore, since the refuse is frozen and maintained frozen it does not deteriorate, whereby pick up of the refuse need not be so frequent as is now commonplace. I envision that such pick up would be necessary perhaps only once every 3 weeks or once a month, thereby materially reducing the cost of refuse pick up. Generalities and specifics as to such refuse disposal are disclosed and claimed in my prior U.S. patents, U.S. Pat. Nos. 3,514,969; 3,650,120; 3,659,427; 3,685,309; and 3,686,889.

It is a general object of the present invention to provide a refuse compacting and freezing apparatus having advantages over those disclosed in my aforesaid prior patents.

Specifically, it is an object of the present invention to provide a refuse compacting and freezing apparatus which is compact and readily installed in substantially any home in an under counter location in the kitchen.

It is yet another object of the present invention to provide apparatus for compacting and freezing refuse which is itself simple and compact in nature, and freezes the refuse and holds it at an optimum temperature.

Still another object of the present invention is to provide improved retaining or backup structure in a refuse compacting and freezing apparatus.

BRIEF DESCRIPTION OF THE DRAWINGS

The present invention will be readily understood from the following description when taken in connection with the accompanying drawings.

DETAILED DISCLOSURE

Figure 2:
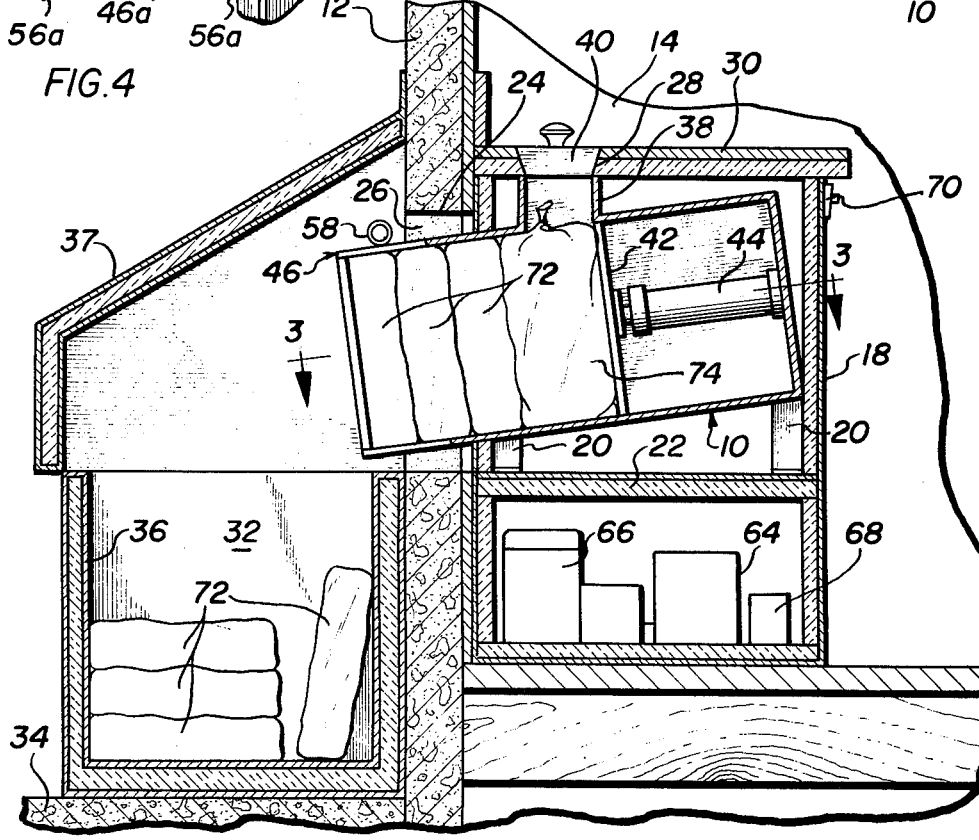
FIG. 2 is a vertical sectional view through such apparatus and surrounding structure including portions of a home.

Turning now in greater particularity to the drawings, there will be seen a refuse or trash compactor and freezer 10 constructed in accordance with the present invention. The compactor and freezer 10 is of generally rectangular box like configuration, and is seen in place in its intended environment in FIG. 2. In FIG. 2 there is shown the exterior wall 12 of a house or the like adjacent the kitchen 14 having a floor 16 and a counter unit 18. The refuse compactor and freezer unit 10 is mounted within the upper portion of the counter unit 18 by means such as brackets 20 extending between the compactor an freezer unit 10 and a transverse wall of shelf 22 in the counter unit. The compactor-freezer unit 10 extends through an opening 24 in the wall, being sealed thereto by suitable means 26, which, for example, might be foamed in place insulation, or other insulating material, to proper size. An opening 28 in the counter top 30 provide for loading the unit 10 as will be set forth in greater detail hereinafter.

The outer end of the compactor-freezer unit 10 exits into an external housing and storage chamber 32 resting on the ground 34 and provided with insulating walls 36. The outer portion of the compactor-freezer unit 10 is housed within an inverted scuttle or roof unit 37 having a diagonally disposed upper wall or roof for shedding or rain and the like, and encircling side walls. The roof unit is constructed with insulating walls and may additionally by supplied with freezer coils to maintain the storage container 32 at below freezing temperature, although in most instances it will be found to be unnecessary. The container 32 is intended to be pulled laterally from beneath the roof unit for inversion to dump out compressed and frozen refuse therein.

The compactor-freezer unit 10 is of substantially square cross section, being on the order of 1 foot square, although optionally slightly higher than wide. The main portion of the unit 10 is about twice as long as the transverse dimension, and is provided in its upper portion with a rectangular opening defined by four walls 38 extending upwardly therefrom to the underside of the counter top 30 immediately below the opening 28 therein. As will be seen the counter top and surrounding walls are insulated, and a removable lid or cover 40 for the opening 28 also is insulated.

Figure 3:
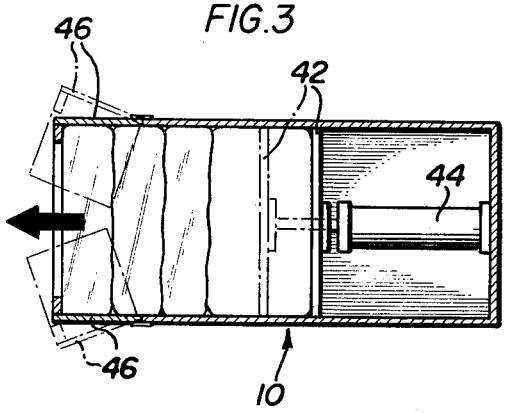
FIG. 3 is a horizontal sectional view through the refuse compacting and freezing apparatus of FIG. 1.

Immediately to the rear or upstream (the right side as shown in the drawings) there is a presser plate 42 in the nature of a ram, and movable forward or to the left by means of a hydraulic cylinder and piston arrangement 44. The cylinder bottoms against the rear or right end wall of the unit 10 and moves the presser plate or ram 42 from the solid line position shown in FIGS. 2 and 3 to the left, to or through the broken line position shown in FIG. 3.

Figure 1:
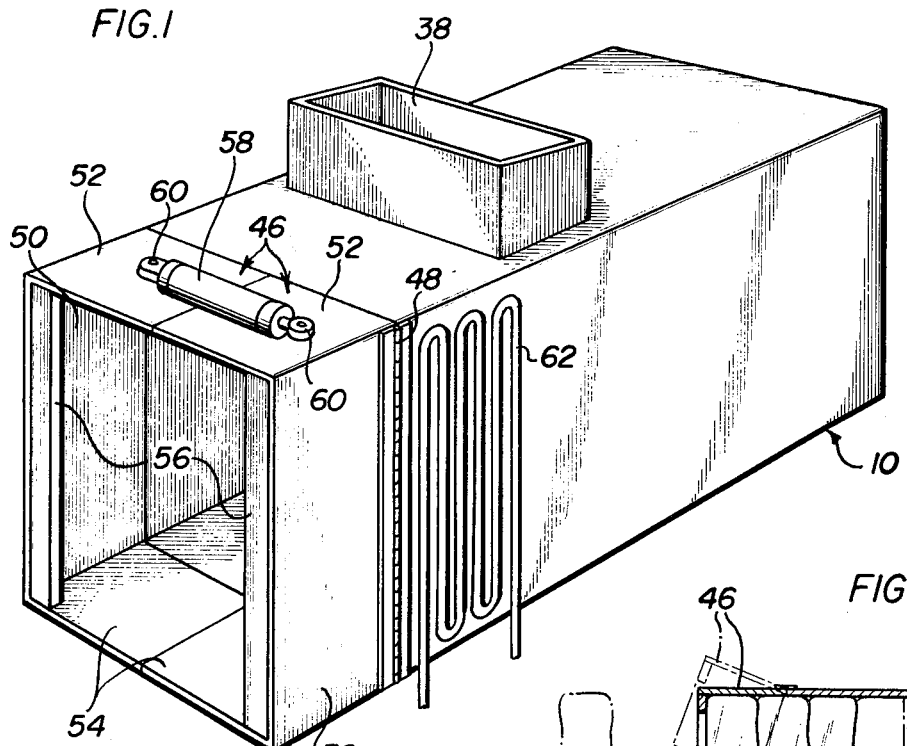
FIG. 1 is a perspective view of a refuse compacting and freezing apparatus in accordance with the present invention.

At the left, downstream, or discharge end of the unit 10 there is a pair of clam shell devices 46 hingedly mounted on the main body of the unit by means of hinges 48. Each of the clam shell devices 46 includes a sidewall 50, a top wall 52, and a bottom wall 54, and also at the outer end thereof a holding bar 56 at right angles to the sidewall 50. A hydraulic piston and cylinder arrangement 58 lies across the top plate 52 and is pivotally connected thereto as at 60 in order to pivot the clam shell device 46 from the rest or the closed position shown in FIG. 1 and in solid line in FIG. 3 to the broken line position shown in FIG. 3.

Expansion or freezing coils 62 are secured along the sidewalls of the main portion of the unit 10 adjacent to the hinges 48 for the clam shell devices 46. A refrigeration unit 64 is positioned beneath the horizontal wall 22, and interconnecting tubing is omitted from the drawings for simplicity, but will be understood as provided in the usual manner. Also disposed adjacent to the refrigeration unit and below the wall 22 is a hydraulic pump and motor unit 66, the conventional hydraulic connections also being omitted for simplicity. A control unit 68 is shown quite schematically in the space beneath the horizontal wall 22, and is connected with a manual control operating unit 70 which may be positioned on the front of the counter unit and connected by suitable electric wiring to the control unit 68. The manual unit 70 will be understood as having an overall on-off control, and also a push button or the like switch for starting a cycle of operation.

Several compacted and frozen units of refuse are shown at 72 within the compacting and freezing unit 19, including the clam shells 46 thereof. The outer-most of these is restrained by the hold bars 56. Additional refuse is dumped into the space between the most upstream of the frozen units 72 and the ram or pressure plate 42, conveniently, but not necessarily, into a plastic bag 74. When the cover 40 is reapplied the operator presses the start switch on the unit 70, whereupon the clam shell devices 46 were moved to their solid line position (FIG. 3) in which position the holding bars restrict forward or downstream movement of previous frozen refuse units 72. Thereafter (it is not critical whether the holding bars made to restraining position immediately after extension or extrusion of a frozen pellet, or just before the start of a compacting operation.) The hydraulic piston and cylinder unit 44 is extended to compact the refuse in the bag 74 against the previously frozen units 72. When the compaction has occurred to a predetermined degree the hydraulic piston and cylinder unit 58 is extended to pivot the clam shell devices 46 to the broken line position of FIG. 3, whereupon the outer frozen refuse unit 72 is pushed from the compaction and freezing unit 10 to drop into storage position in the container 32. The hydraulic piston and cylinder arrangements then contract to close the clam shells and to retract the ram or presser plate 42, whereby the unit is conditioned for another cycle of operation.

Figure 4:
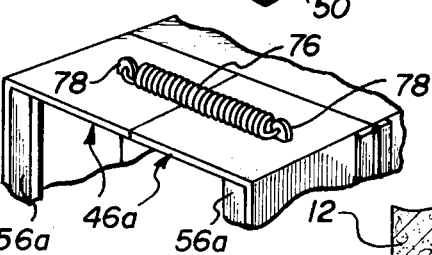
FIG. 4 is a fragmentary perspective view similar to a portion of FIG. 1 illustrating a modification of the invention.

I have found that the freezing coils 62 should maintain the refuse at approximately 18° F. At higher temperatures the frozen refuse may not be hard enough for breaking of bottles there against. On the other hand, at lower temperatures the adjacent pellets of frozen refuse might freeze together sufficiently firmly that the outer one would not properly break off to drop into the storage container. The angular inclination of the unit, about 1 inch in 10, facilitates separation of the outer frozen refuse pellet, and also provides that any drip of liquid will be into the storage container. A modification of the invention is shown in FIG. 4 wherein like parts are identified by similar numerals with the addition of the suffix a. In this instance the hydraulic piston arrangement for the clam shell device is omitted and spring 76 (only the top one of which is shown) are stretched between suitable spring anchors 78 on the top walls 52a and the bottom walls (not shown) of the clam shell devices 46a. One heavier spring could be used instead of two springs, but two springs provide a more balanced force.

In this embodiment, when sufficient force develops on the downstream frozen refuse unit or pellets, the pellet forces the clam shell devices apart against the force of the springs 76, and extrusion or expulsion of the downstream frozen pellet occurs, as soon as active extrusion stops, the confronting edge of the restraining bars 56a (which are sharp) dig into the sides of the pellet and the clam shell devices close.

In case of blockage the spring force may be relaxed or the pellet temperature may be raised to soften the pellet, or both. As will be apparent this structure insures composition of fresh refuse before extrusion occurs, assuming spring force to be properly adjusted. Such adjustment can be effected by any suitable adjustment means.

The specific example of the invention is herein shown and described as for illutrative purposes. Various changes in structure will no doubt occur to those skilled in the art, and will be understood as forming a part of the present invention insofar as they fall within the spirit and scope of the appended claims.

The invention is claimed as follows:

1. Refuse disposal apparatus comprising a receptacle for refuse, compressing means, means for operating said compressing means to compact said refuse in said receptacle and to force previously compacted refuse from said receptacle along a predetermined path, means adjacent said receptacle for freezing said refuse as compacted, restraint means adjacent said receptacle for restraining a previously compacted and frozen mass of refuse, said mass serving as a backup means against which said compressing means compacts refuse, said restraint means comprising a pair of backup members at least partially across said predetermined path and engaged by said mass of refuse along opposite edges thereof opposite to said compressing means, and means for retracting said backup members transversely of said path to permit release of previously compacted and frozen refuse.

2. Refuse disposal apparatus as set forth in claim 1 and further including mean pivotally mounting said pair of backup members from said receptacle for pivoting of said members about pivot positions upstream of said backup members relative to said predetermined paths.

3. Refuse disposal apparatus as set forth in claim 2 wherein each of said backup members and its pivotal mounting means comprises a clam shell device.

4. Refuse disposal apparatus as set forth in claim 3 wherein each said clam shell device includes sidewall and top and bottom walls.

5. Apparatus as set forth in claim 1 wherein said freezing means freezes and holds refuse at substantially 18° F.

6. Apparatus as set forth in claim 1 wherein said predetermined path is inclined downwardly at a shallow angle.

7. Refuse disposal apparatus as set forth in claim 6 and further including means pivotally mounting said pair of backup members from said receptacle for pivoting of said members about pivot positions upstream of said backup members relative to said predetermined paths.

8. Refuse disposal apparatus as set forth in claim 6 wherein each of said backup members and its pivotal mounting means comprises a clam shell device.

9. Refuse disposal apparatus as set forth in claim 6 wherein each said clam shell device includes sidewall and top and bottom walls.

10. Refuse disposal apparatus as set forth in claim 1 wherein said freezing means freezes and stores refuse at substantially 18° F.

* * * * *